W. F. DAWSON.
MEANS FOR SUPPORTING COLLECTOR RINGS.
APPLICATION FILED FEB. 20, 1907.

900,710.

Patented Oct. 13, 1908.

WITNESSES
W. Ray Taylor.
J. Ellis Glen.

INVENTOR
WILLIAM F. DAWSON.
by Albert G. Davis
ATTY.

UNITED STATES PATENT OFFICE.

WILLIAM F. DAWSON, OF RUGBY, ENGLAND, ASSIGNOR TO GENERAL ELECTRIC COMPANY, A CORPORATION OF NEW YORK.

MEANS FOR SUPPORTING COLLECTOR-RINGS.

No. 900,710.     Specification of Letters Patent.     Patented Oct. 13, 1908.

Application filed February 20, 1907. Serial No. 358,458.

*To all whom it may concern:*

Be it known that I, WILLIAM F. DAWSON, a citizen of the United States, residing at Rugby, England, have invented certain new and useful Improvements in Means for Supporting Collector-Rings, of which the following is a specification.

My invention relates to dynamo-electric machines and particularly to the support of the collector or slip rings in such machines. These rings must be supported upon the shaft of the machine in such a manner as to be effectively insulated from the shaft and at the same time be rigidly united to the shaft so as not to become loose during the operation of the machine. The support of these rings in large sized machines, wherein the mechanical stress upon the supporting means is considerable and the difference of potential between the shaft and the rings is great has heretofore offered considerable difficulty.

The object of my invention is to provide a simple and novel form of supporting means for collector or slip rings, whereby the rings may be rigidly held to the shaft and thoroughly insulated therefrom under any conditions of service to which they may be subjected.

To the above end, I secure to the inner periphery of each collector ring a plurality of cup-shaped members; the open ends of the cups pointing toward the center of the ring. These cups may readily be insulated from the ring so that any difference of potential may be maintained between the cups and the ring without danger of short-circuiting. The open ends of the cups are machined so as to fit closely upon the shaft or other supporting member on which the collector rings are to be carried. The cups have a large bearing surface upon the supporting member and therefore the danger of their working loose is minimized.

Figure 1:
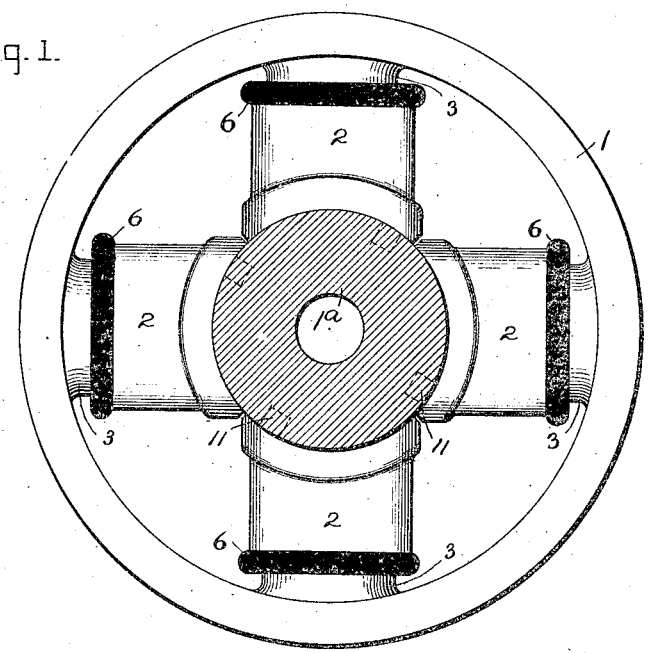
Figure 2:
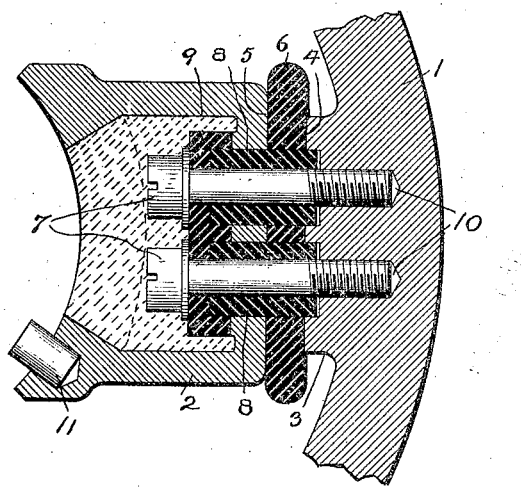
Figure 3:
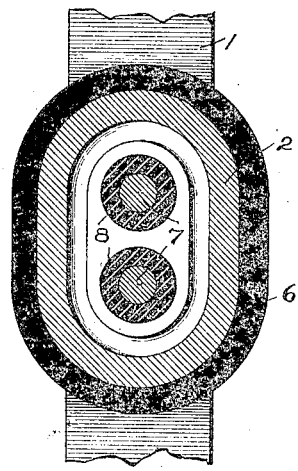

My invention in its various aspects will be more fully understood from the following detailed description taken in connection with the accompanying drawing, wherein Figure 1 is a side elevation of a collector ring supported upon a shaft in accordance with a preferred form of my invention; Fig. 2 is a cross-section through a portion of the collector ring and one of the supporting devices taken on a plane at right angles to the axis of the supporting shaft; and Fig. 3 is a cross-section taken at right angles to Fig. 2, through the supporting device.

Referring to the drawing, 1 indicates a collector ring and 1ᵃ a shaft or other member upon which it is carried and from which it is insulated. In accordance with my invention the ring is supported from the shaft by means of a plurality of cups carried by the ring. The number of these cups will depend upon the diameter of the supporting shaft, that is, as the diameter of the supporting member approaches that of the collector ring, the number of cups which may be used, and preferably are used, increases. In the drawing I have shown the parts so proportioned that four of these cups 2, 2, 2, 2, serve to give a bearing surface extending substantially throughout the entire circumference of the shaft. The cups may be secured to the collector ring in any convenient manner. This is preferably accomplished by forming the ring with inwardly-projecting bosses 3 having flattened faces 4; making the closed ends of the cups flat also, as at 5; placing a layer of insulation 6 in the shape of a washer between each cup and the corresponding boss; and then securing the cups to the ring by means of insulated bolts or screws 7. The bolts or screws 7 may conveniently be insulated from one of the parts, preferably the cup, by means of insulating sleeves or bushings 8 which extend through the closed end of the cups, through the insulating material 6 and, if desired, part way into the bosses on the collector ring. Washers of insulating material 9 are placed in the cups across the ends of the sleeves or bushings. The bolts or screws pass through the sleeves or bushings and into the bosses and their heads engage with the washers 9. The bolts or screws are tightened from the interior of the cups and draw the parts firmly together. The openings 10 in the bosses into which the ends of the bolts or screws enter do not extend entirely through the collector ring, so that the outer or bearing surface of the ring remains unbroken.

After the cups have been assembled within the ring and the bolts or screws tightened, the whole is preferably dried in a vacuum and the bolts or screws again tightened. This process is repeated as long as the drying operation leaves any slack to be taken up by the screws or bolts. The cups and insulating washers between them and the collector ring are then treated with copal or other suitable varnish and the cups themselves are filled with a moisture-resisting insulating compound such as sulfur. The inwardly-projecting ends of the cups are then bored out to fit the shaft or other supporting member upon which the ring is then forced. To prevent rotation of the ring on the shaft dowel-pins or set-screws 11 may be passed through the edge of one or more of the cups and into the shaft.

It will be seen that the collector ring and its inwardly-projecting members constitute an extremely stiff and secure structure wherein the ring member is reliably insulated from the remaining parts in a cheap and simple manner; the broad bearing surfaces on the cups and the ring making it possible to insulate thoroughly without detracting from the mechanical strength of the structure as a whole. By placing the insulation between the cups and the ring, the cups are enabled to engage directly with the shaft throughout a large area, and thus hold the ring securely on the shaft.

What I claim as new and desire to secure by Letters Patent of the United States, is,—

1. In a dynamo-electric machine, a shaft, a collector ring, and a connection between said shaft and said ring comprising a cup-shaped member insulated from said ring and engaging said shaft at its open end.

2. In a dynamo-electric machine, a shaft, a collector ring, and a connection between said shaft and said ring consisting of cups secured at their bases to and insulated from said ring and engaging said shaft at their open ends.

3. In a dynamo-electric machine, a shaft, a collector ring, and a plurality of cup-shaped members secured to and insulated from said ring, said members projecting radially from the ring and having their open ends fitted to the shaft.

4. A collector ring having extending radially therefrom a plurality of cup-shaped members secured to and insulated from said ring at their bases, and having their open ends shaped to fit a supporting member.

5. In combination, a collector ring member, a cup member, a layer of insulation between the ring member and the base of the cup member, a holding member passing through the base of the cup and into the ring, and insulation between said holding member and one of the other members.

6. In combination, a collector ring, a cup, a layer of insulation between the ring and the base of the cup, and insulated means for holding the cup on the ring.

7. In combination, a collector ring, a cup, a layer of insulation between the ring and the cup, and an insulated screw member passing through the base of the cup and into the ring.

8. In combination, a collector ring having an inwardly-projecting boss, a cup insulated at its base from said boss, and a screw extending through the base of the cup into the boss and insulated from the cup.

9. In combination, a collector ring, a supporting cup, a layer of insulation between the ring and the base of the cup, an insulated screw passing through the base of the cup into the ring, and insulating material filling the cup above the end of the screw.

10. The method of forming supports for collector rings which consists in securing a cup to the ring by means of insulated screws, an insulated washer having first been inserted between the cup and the ring, and alternately drying the insulation in a vacuum and tightening the screws.

In witness whereof, I have hereunto set my hand this thirty-first day of January, 1907.

WILLIAM F. DAWSON.

Witnesses:
 CHARLES H. FULLER,
 J. A. FOSTER.